United States Patent
Zhang et al.

(10) Patent No.: US 7,937,669 B2
(45) Date of Patent: May 3, 2011

(54) ACCESS CONTROL SYSTEM WITH RULES ENGINE ARCHITECTURE

(75) Inventors: KaiLai Zhang, Shanghai (CN); Liang Qian, Shanghai (CN); Pu Xu, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 572 days.

(21) Appl. No.: 11/761,819

(22) Filed: Jun. 12, 2007

(65) Prior Publication Data
US 2008/0313556 A1    Dec. 18, 2008

(51) Int. Cl.
G06F 3/048    (2006.01)

(52) U.S. Cl. .......................... 715/789; 715/765

(58) Field of Classification Search ................ 715/789; 717/105; 340/540
See application file for complete search history.

(56) References Cited

U.S. PATENT DOCUMENTS

| | | | | |
|---|---|---|---|---|
| 4,353,064 A | * | 10/1982 | Stamm | 340/5.61 |
| 5,267,145 A | * | 11/1993 | Zifferer et al. | 700/86 |
| 5,450,578 A | | 9/1995 | Mackenthun | 714/4 |
| 5,742,022 A | * | 4/1998 | Crawford et al. | 219/86.25 |
| 6,268,853 B1 | * | 7/2001 | Hoskins et al. | 700/83 |
| 6,484,261 B1 | | 11/2002 | Wiegel | |
| 6,742,448 B1 | * | 6/2004 | Davis et al. | 100/341 |
| 6,754,885 B1 | | 6/2004 | Dardinski et al. | |
| 6,862,553 B2 | * | 3/2005 | Schwenke et al. | 702/183 |
| 7,117,043 B1 | * | 10/2006 | Frederick et al. | 700/21 |
| 7,136,711 B1 | * | 11/2006 | Duncan et al. | 700/83 |
| 7,184,428 B1 | * | 2/2007 | Gerszberg et al. | 370/352 |
| 7,272,815 B1 | * | 9/2007 | Eldridge et al. | 717/101 |
| 7,657,329 B1 | * | 2/2010 | Lloyd | 700/17 |
| 2002/0171546 A1 | * | 11/2002 | Evans et al. | 340/540 |
| 2004/0010724 A1 | | 1/2004 | Brown et al. | |
| 2004/0064453 A1 | | 4/2004 | Ruiz et al. | |
| 2004/0159700 A1 | * | 8/2004 | Khan et al. | 235/380 |
| 2006/0102717 A1 | | 5/2006 | Wood et al. | |
| 2006/0206860 A1 | * | 9/2006 | Dardinski et al. | 717/105 |
| 2010/0077217 A1 | * | 3/2010 | Callaghan | 713/175 |

FOREIGN PATENT DOCUMENTS

| | | |
|---|---|---|
| WO | WO 99/67689 | 12/1999 |
| WO | WO 2004/063960 | 7/2004 |
| WO | WO 2008/157755 | 12/2008 |

* cited by examiner

*Primary Examiner* — Boris Pesin
*Assistant Examiner* — Brandon Parker
(74) *Attorney, Agent, or Firm* — Husch Blackwell

(57) ABSTRACT

As access control system and method is provided. The access control system in one aspect may comprise a client application operable to provide a user interface for allowing a user to dynamically configure rules and associated parameters for controlling access to an entity; a rules engine proxy operable to receive said rules and associated parameters from the client application, the rules engine proxy further operable to dynamically compile and execute said rules; and a controller coupled to the rules engine proxy operable to receive input and further operable to trigger the rules engine proxy to execute one or more of said rules in response to the received input.

13 Claims, 20 Drawing Sheets

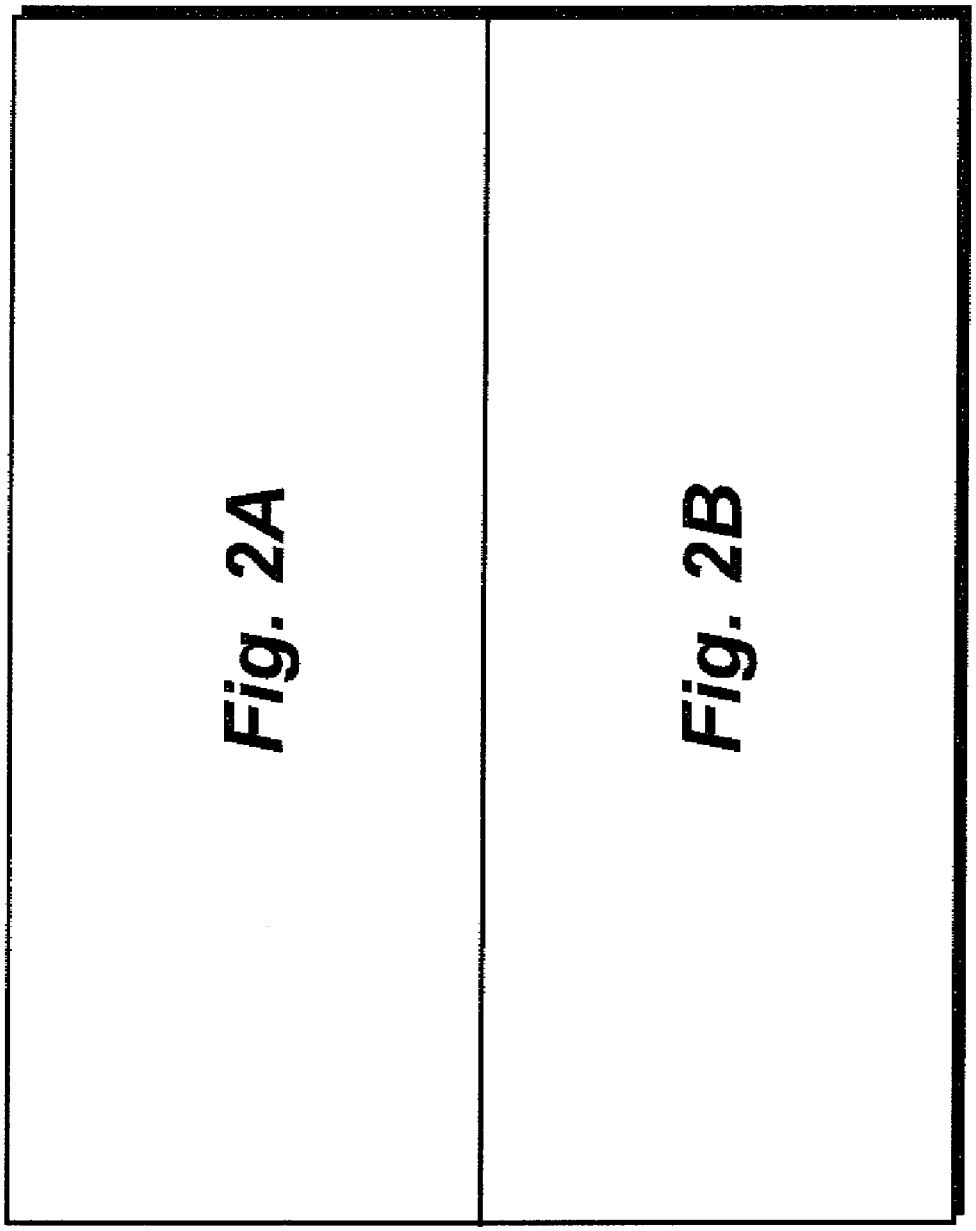

Fig. 2B

| CardNumber | FirstName | LastName | Activation | Expiration | Description |
|---|---|---|---|---|---|
| 41084 | Kevin | Zhang | 2006-7-1 ▶ | 2006-8-1 | |
| 7099 | Kevin | Zhang | 2006-7-1 | 2006-8-1 | |
| 7089 | Leah | Chin | 2006-7-1 | 2006-8-1 | |
| 7090 | Leah | Chin | 2006-7-1 | 2006-8-1 | |

OK    Cancel

V  A   ☐ Dur

| CardNumber | FirstName | LastName | Activation | Expiration | De |
|---|---|---|---|---|---|
| 2262 | Kevin | Zhang | 2006 | 2006 | Ac |
| 2262 | Kevin | Zhang | 2006 | 2006 | Ac |

Ⓐ

214

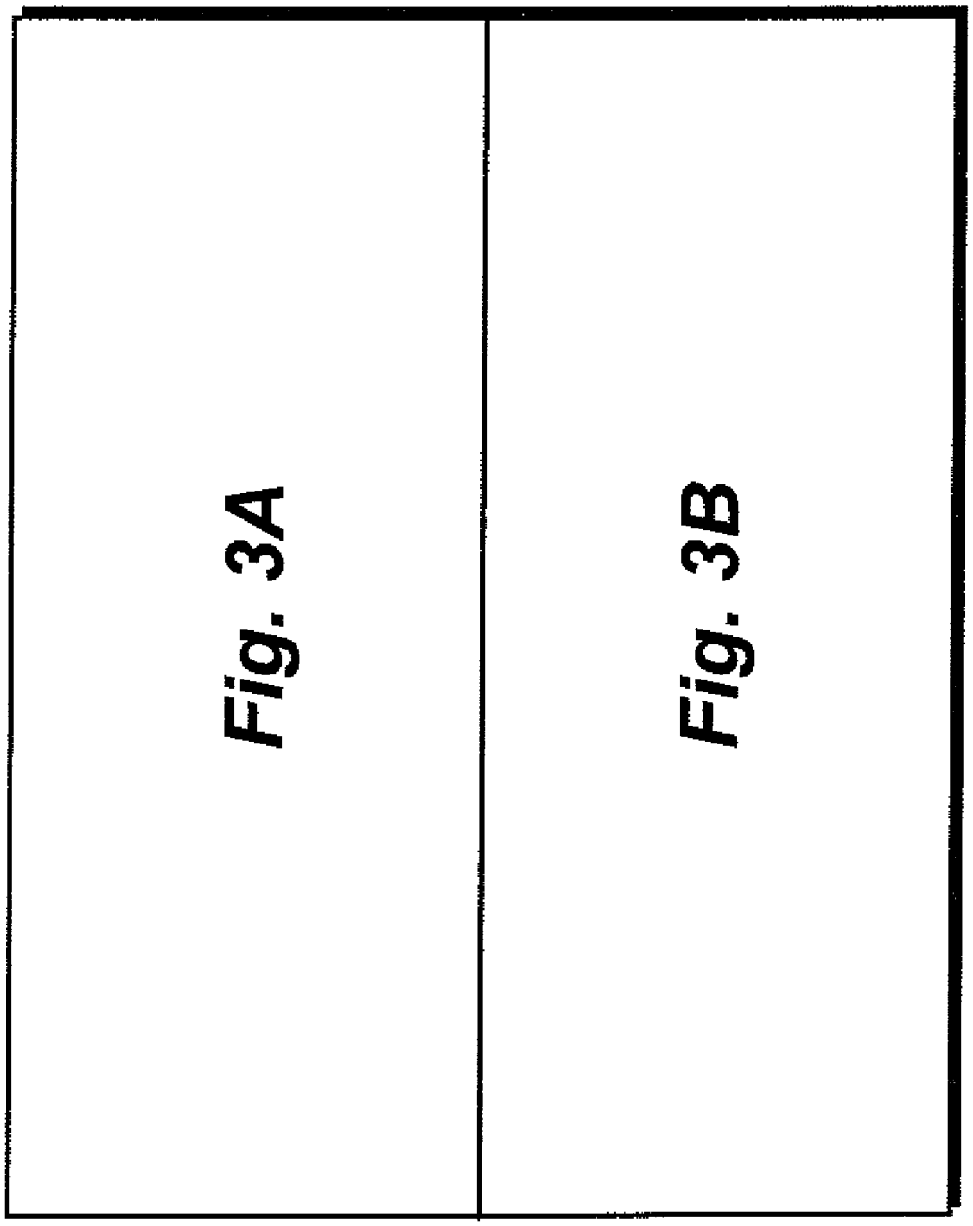

ACCESS CONTROL SYSTEM WITH RULES ENGINE ARCHITECTURE

BACKGROUND OF THE INVENTION

1. Field of Invention

The present disclosure generally relates to security systems, and particularly to access control system with rules engine architecture.

2. Description of Related Art

Access control systems ensure that only authorized persons or entities access elements such as physical entries to buildings or areas, access to computer system or data, etc. Access control systems can provide different levels of access to different persons or entities based on different authorization levels, for example configured in the systems. Many systems exist that implement authentication mechanism for controlling or verifying authorized access to physical areas, locked doors, computer systems, data, etc. Most common approach is authentication by user id and password. These systems may use a physical device, such as a bank card, a smart card, or a computer chip to identify a person. Additionally or alternatively, the systems may use biometrics to identify physical characteristics of a person. Biometrics may include technologies that verify voice, perform a retinal scan, palm identification, and fingerprints.

Access control systems can provide different levels of access to different persons or entities based on different authorization levels, for example configured in the systems. Typically, the existing systems hard code or implement in a similar manner the access control authorization configuration the meet specific needs of an individual entity or user. For instance, bank A may have one logic and authorization configuration required to meet its security needs, while bank B may have a different logic and authorization configurations.

What is desired, therefore, is an access control system that can be used to configure and execute different rules and configurations without having to excessively re-implement the access control system in order to meet the different requirements of different users or customers. It would be also desirable to have a flexible access control system-n in which the users or customers may dynamically update or modify the rule logic and associated parameters and be able to execute the rules, for example, without having to request a customer service to re-implement the access control system.

BRIEF SUMMARY OF THE INVENTION

An access control system and method is provided. The access control system in one aspect may comprise a client application operable to provide a user interface for allowing a user to dynamically configure rules and associated parameters for controlling access to an entity; a rules engine proxy operable to receive said rules and associated parameters from the client application, the rules engine proxy further operable to dynamically compile and execute said rules; and a controller coupled to the rules engine proxy operable to receive input and further operable to trigger the rules engine proxy to execute one or more of said rules in response to the received input.

Further features as well as the structure and operation of various embodiments are described in detail below with reference to the accompanying drawings. In the drawings, like reference numbers indicate identical or functionally similar elements.

DETAILED DESCRIPTION OF THE INVENTION

System and method for implementing rules engine in security access control system are provided. An application such as a user interface application allows a user to configure or define rules specific to the user's requirements. The system and method in one embodiment intelligently parses particular rule configurations that are specific to a user and also implements user-changed requirements. Based on the defined rules, a compiler or rules engine automatically parses each statement of configuration program and assigns it to the access controllers for pre-defined execution.

Figure 1A:
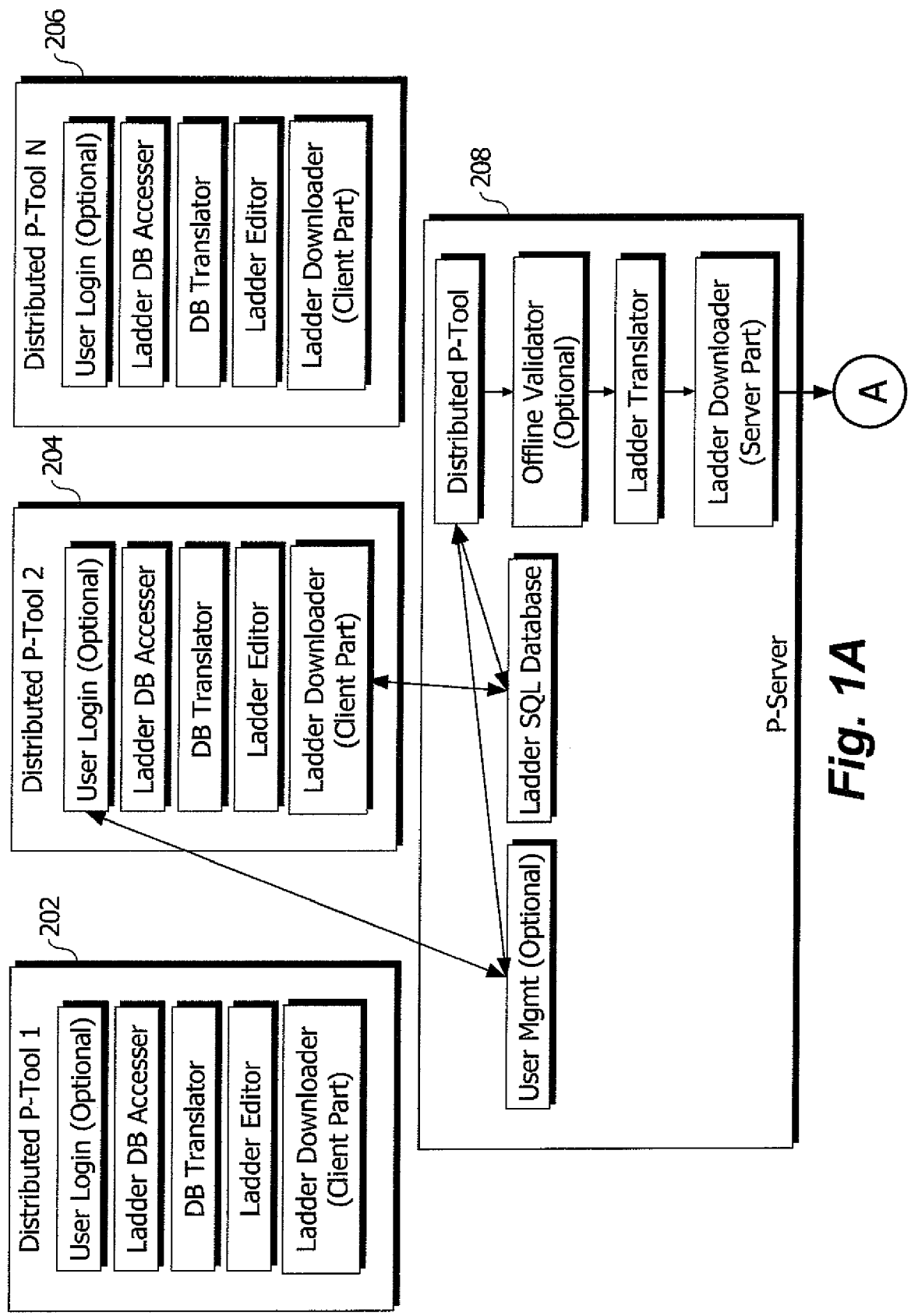
FIG. 1 is an architectural diagram illustrating a system of the present disclosure in one embodiment.
Figure 1B:
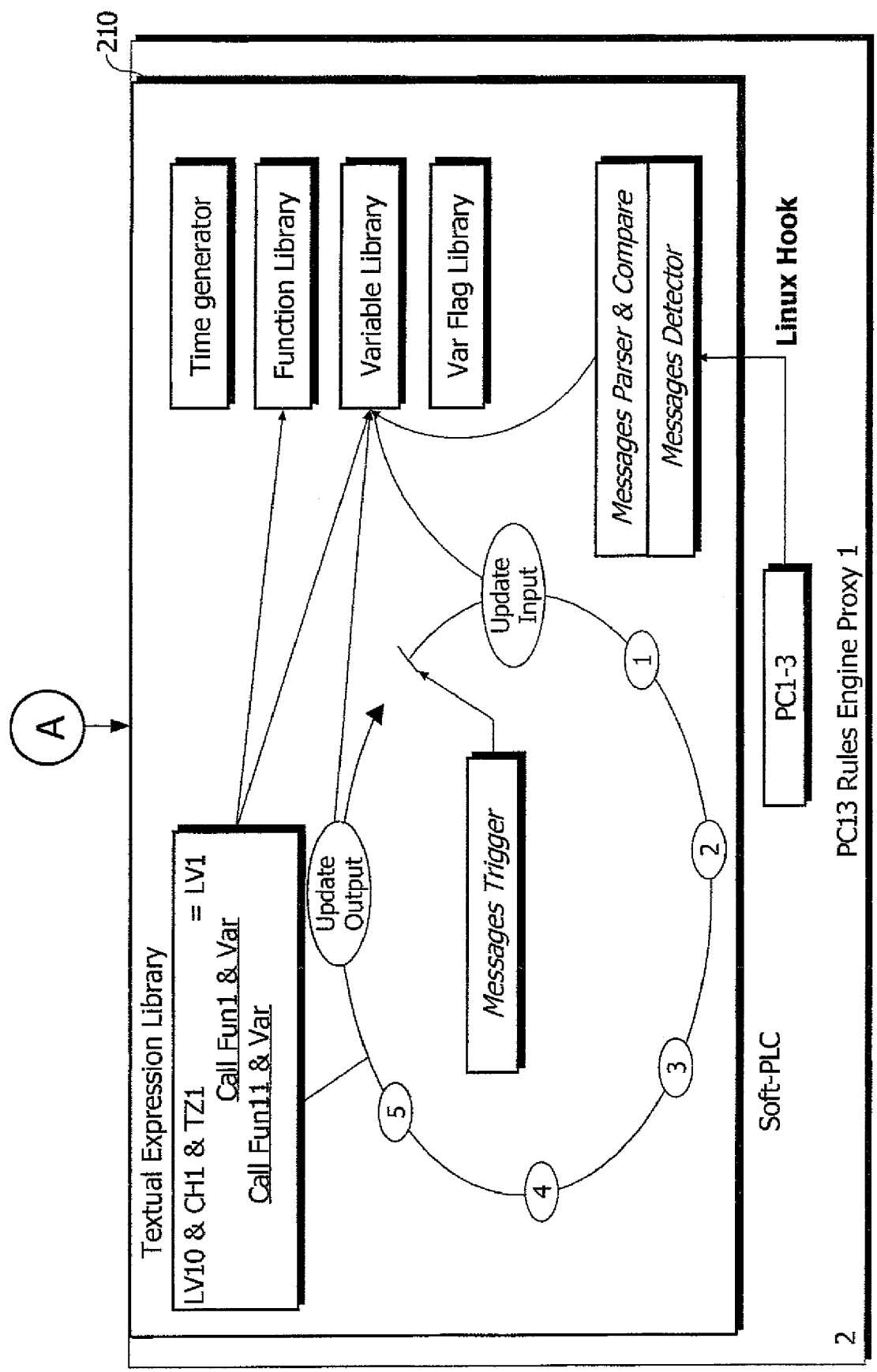
Figure 1C:
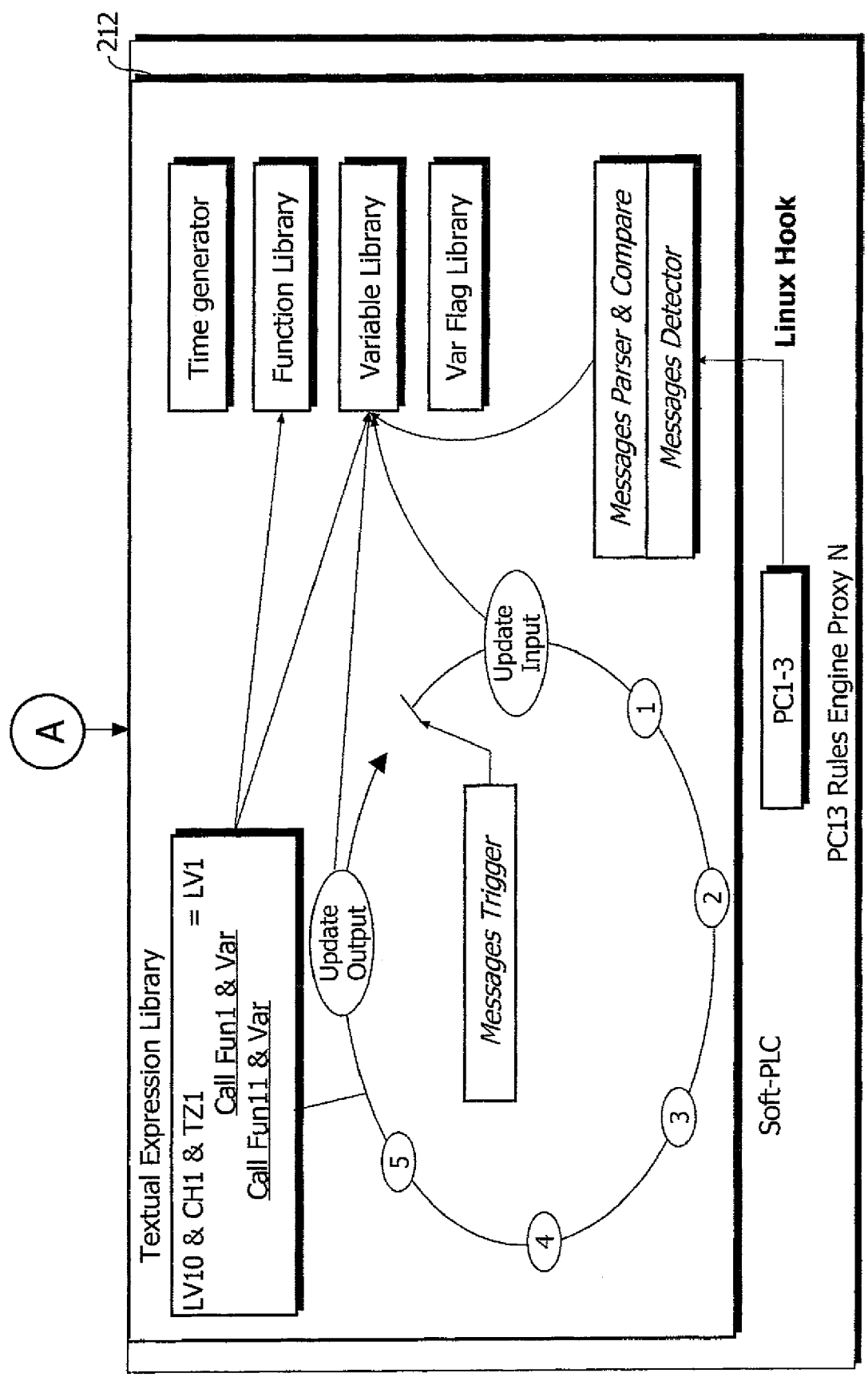

FIG. 1 is an architectural diagram illustrating a system of the present disclosure in one embodiment. Client application tools 202, 204, 206 may be distributed and installed on various client systems, workstations, etc. Client application tools 202, 204, 206 allow a user to enter and edit rules, change parameters, etc. The client application 202, 204, 206 may provide various levels of access to different types of users. For example, a user with an administrator status may be allowed to add and edit rule logic, a user with an operator status may be allowed to change parameters such as adding and deleting users, and a user with a guest status may be allowed to view the rules, but not change them, etc. Other user access levels or permissions are possible.

In one embodiment, an application tool may comprise functional components or functionalities for processing user login and authentication, graphical user interface and editor for presenting the rule logic and other information in a presentable form, a translator that translates stored data such as the rule logic and other information into a graphical form for presentation, a downloader or a communication functionality that communicates data such as the rule logic and other information to a server. A client application 202, 204, 206 may locally store rule logic and other data in a local database to be retrieved for presentation and editing.

A server component 208 collects data from the client, for example, new rules, modifications to the existing rules, or other parameter changes, and uploads the data to one or more rules engine proxies 210, 212. During execution, rules engine proxies 210, 212 dynamically generate and execute code for enforcing the rules, for example, based on the rules configured by a user and downloaded to the proxies. In this way, users may dynamically configure and modify rules based each user's specifications.

Figure 2A:
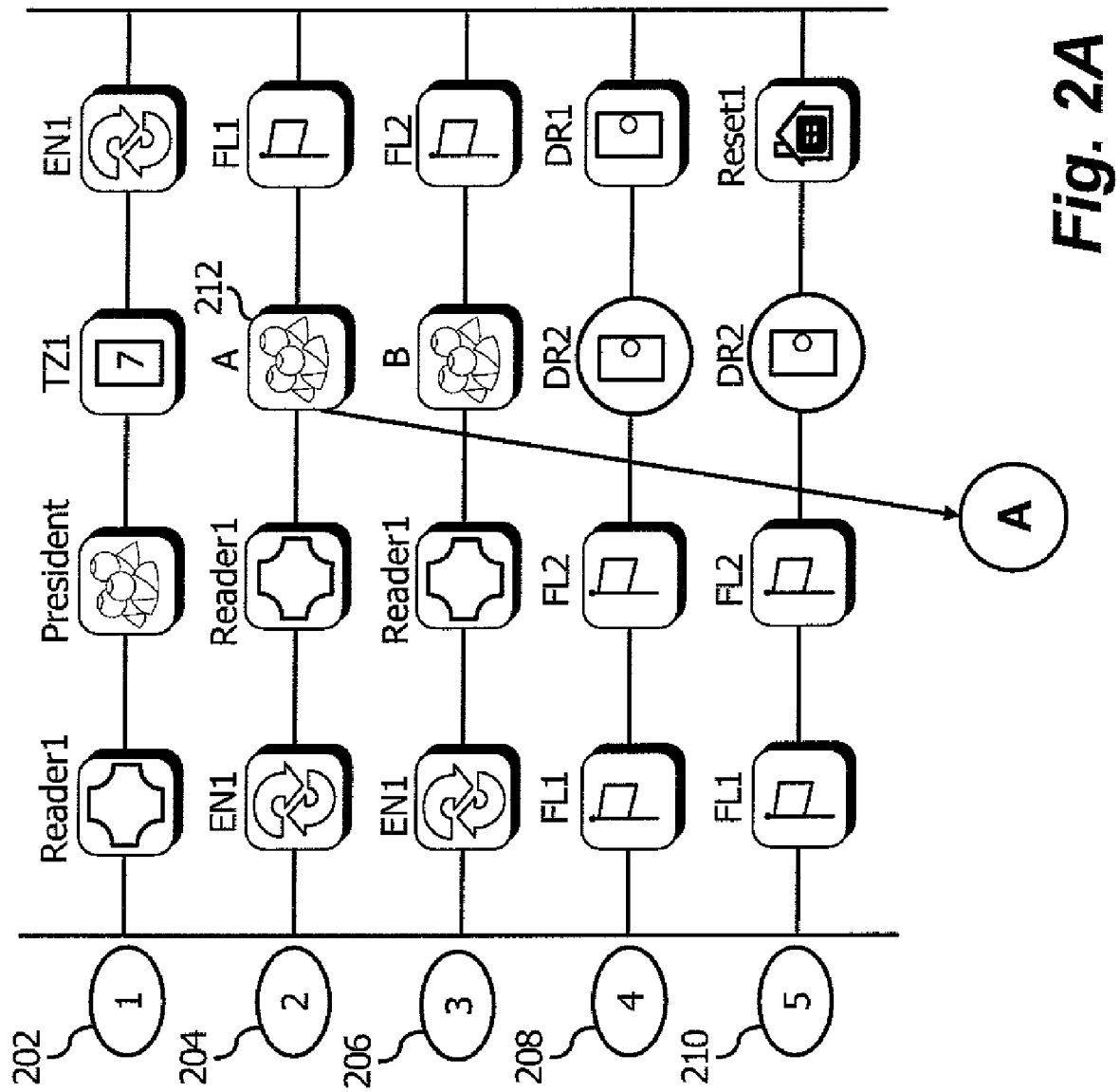
FIG. 2 illustrates an example of a ladder icon diagram representing access control logic in one embodiment of the present disclosure.

FIG. 2 illustrates an example of a ladder icon diagram representing access control logic in one embodiment of the present disclosure. In the ladder diagram, if the variables represented by the icons appearing on the same level of the ladder evaluate to true then the variable represented by the rightmost icon on that same level in the ladder evaluates to true. The ladder diagram shown in FIG. 2 implements the following logic for a card swiped at a card reader device. At level 1 shown at 202, if a reader device is "Reader1", access card belongs to or has access level of "president", the time at which the card is swiped is within a specified time zone, then "EN1" flag is enabled or set. At level 2 shown at 204, if flag "EN1" is enabled, another card belonging to user "A" is swiped at reader device "Reader1", then a parameter "FL1" is enabled or set. At level 3 shown at 206, if "EN1" flag is enabled and card belonging to user "B" is swiped at "Reader1" device, then "FL2" parameter is enabled or set. At level 4 shown at 208, if "FL1" and "FL2" parameters are set and "DR2" evaluates to true, that is, for example, the door identified as "DR2" is shut ten the door identified as "DR1" is opened. At level 5 shown at 210, if "FL1" and "FL2" parameters are set and "DR2" is true, then set "Reset1" to true, which triggers resetting various data and parameters to default values.

The logic shown at level 206 in combination with the logic at levels 1 and 2 (202 and 204) is an example of the logic for implementing multi-card check at a device for opening a door or other enabling access to secured area. That is, the logic at those levels checks that both user "A" and "B" have swiped the card at a reader device, before enabling parameters "FL1" and "FL2" for allowing access to "DR1". The logic shown at 208 is an example that implements interlock requirement for providing access to "DR1". For example, the logic checks that another door or access entry "DR2" is closed before allowing access to "DR1".

In one embodiment, the values for the icons need not be a single value, rather they may comprise multiple of range of values. For example, user "A" icon shown at 212 may include a number of users. Thus, when a rules engine proxy checks for user "A" criterion, it may compare the swiped user with a number of qualified users.

A user of the client application may create or edit rules in the ladder icon diagram, for instance, by dragging and dropping the appropriate icons on the user interface. A user may further enter the desired values for the icons in the diagram. For example, clicking on that icon may present a pop-up screen 214 via which a user may add, delete, and modify the values associated with that icon.

Figure 3A:
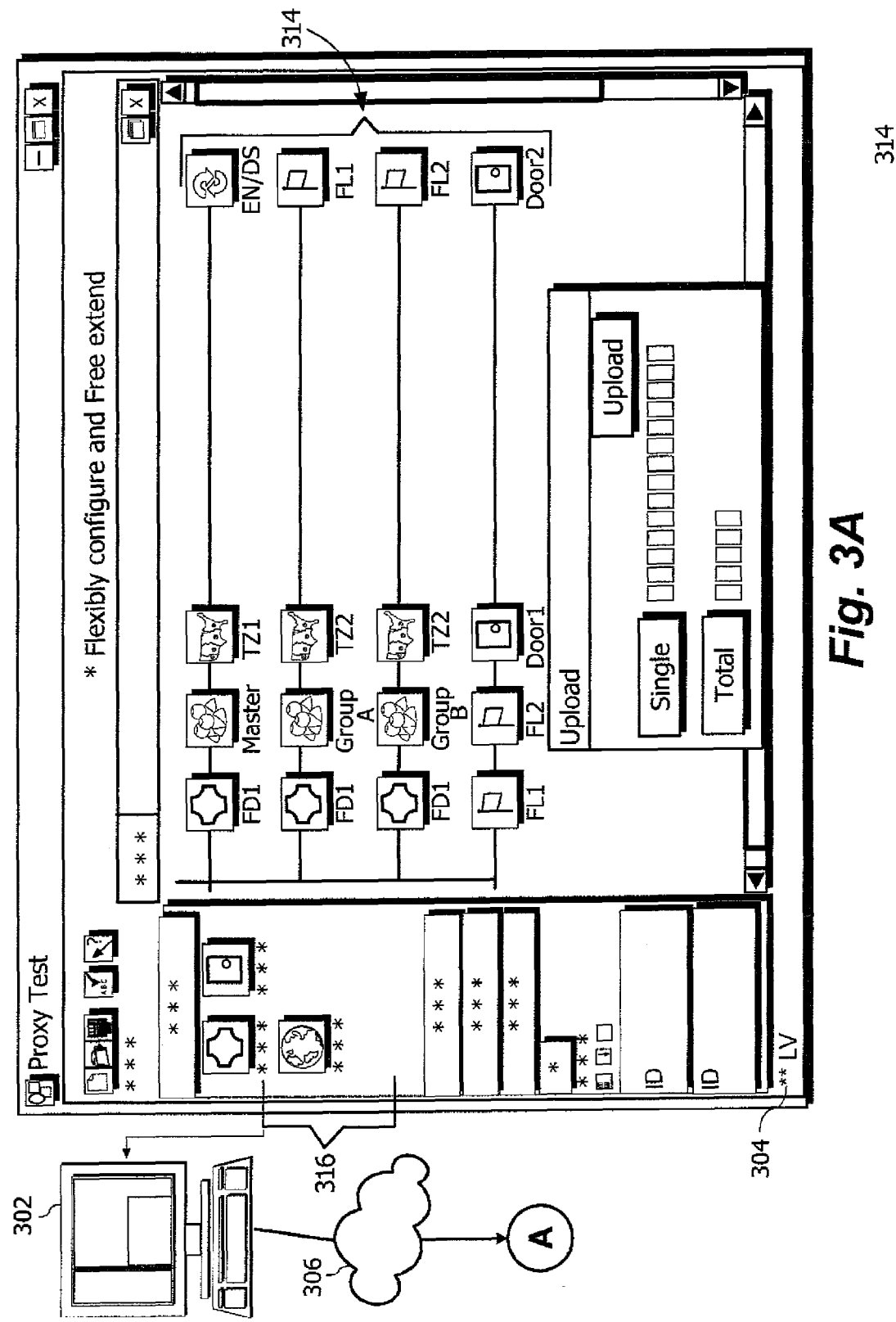
FIG. 3 is a diagram showing a rules engine system of the present disclosure in one embodiment.
Figure 3B:
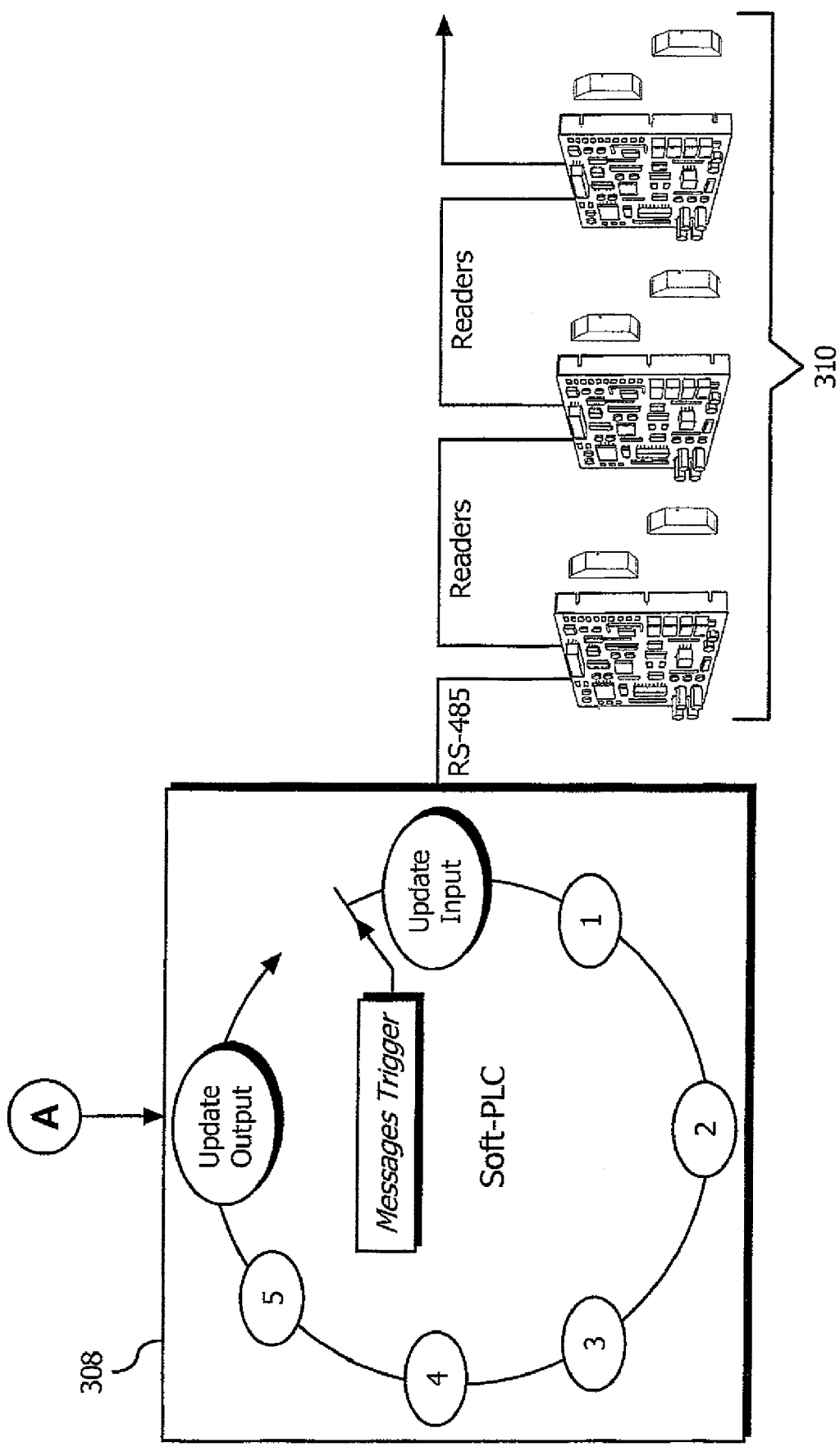

FIG. 3 is a diagram showing a rules engine system of the present disclosure in one embodiment. A client system 302 may include an application tool, which may be used to configure various logic rules that dictate security access to security systems. The application tool as described above may include a graphical user interface such as shown at 304 for adding and editing rules defined for example by a user to meet the user's specific needs. In one embodiment the rules may be edited using graphical components such as a ladder diagram 314. Icons from a panel 316 may be dragged and dropped in the ladder diagram to create logic rules. A mouse pass over an icon may trigger a popup of information associated with that icon. Double clicking on the icon may enable editing of the information associated with that icon. Icons values may also be added, modified using the interface 304. A graphical user interface of the present disclosure such as the ladder diagram schema shown may use various icon symbols to denote different elements or components of the logic rules.

The application tool in one embodiment translates the entered and/or edited rules into an expression and uploads the expression to a rules engine proxy 308. The application tool may also store the rules in the client system 302 locally. The client system 302 may be connected to a rules engine proxy 308 via any know or will be known communication system or network 306, wired or wireless or combination of both, etc., such as the LAN, WAN, Internet. The data from the client system 302 may be uploaded using protocols such as FTP or any other data transferring protocols or mechanisms.

One or more controllers 310 receiving card swipes or other input entries connect to a rules engine proxy. An example of a controller 310 is a card reader device that reads data on a card and sends the data to a rules engine proxy 308. Any known or will be known communication mechanism may be used to connect the controllers to rules engine proxies. In one embodiment, a rules engine proxy may be integrated with a controller. In FIG. 3, RS-485 connects a controller and a rules engine proxy, for example, which may reside in computer systems such as workstations, mid size systems, legacy systems.

In operation, a user may swipe a card at a reader device associated with a controller 310. The controller 310 then sends the data on the card to a rules engine proxy 308. When a card is swiped or information otherwise entered, the data is sent to the rules engine proxy 308, which triggers evaluation of rules associated with the received information. Upon evaluation of the rules logic associated with the received information, rules engine proxy 308 outputs status as to whether access should be allowed or denied. Output status that allows access may result in automatically opening or unlocking an entry such as a door.

Figure 4A:
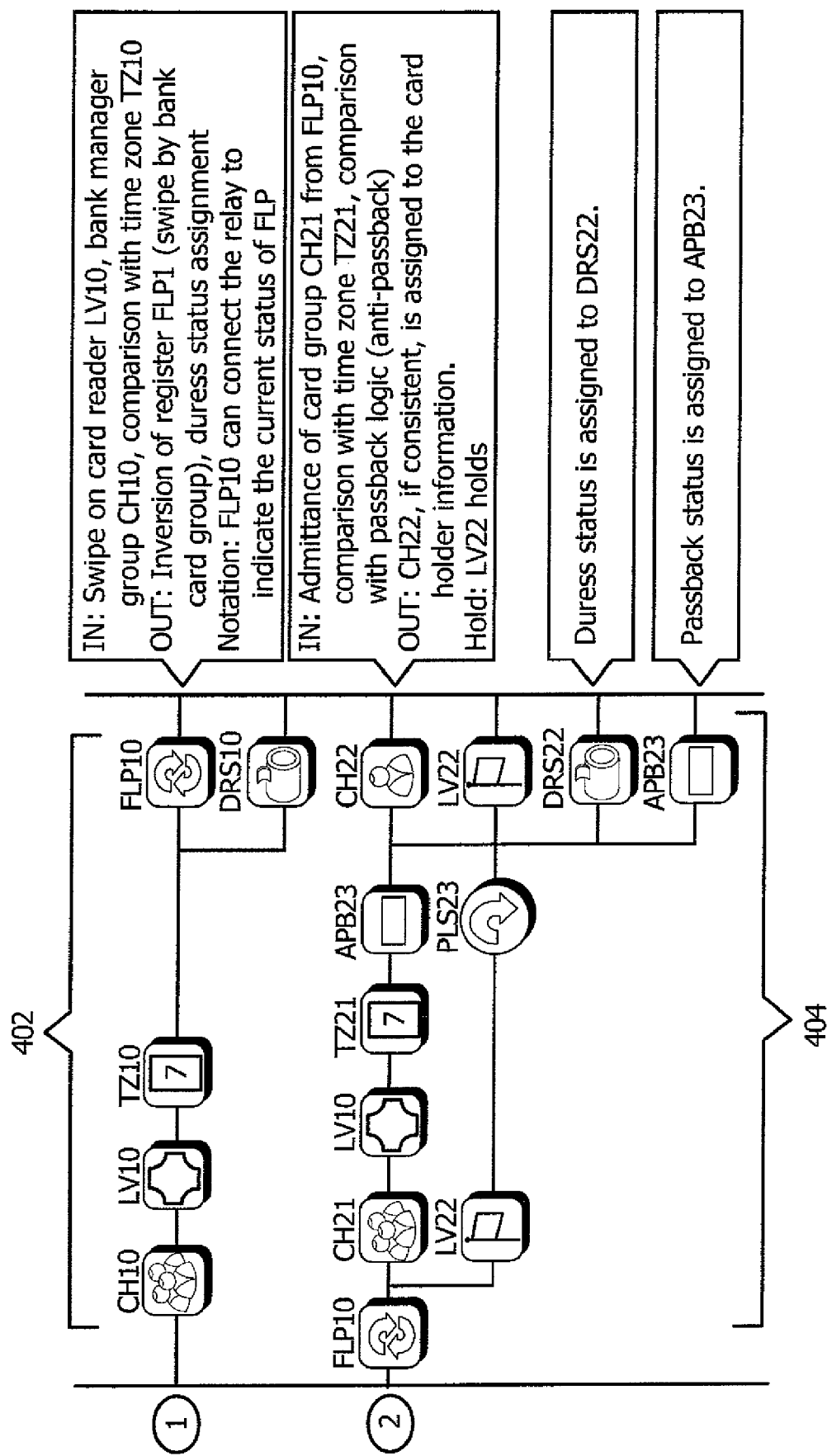
FIGS. 4A-4G illustrate an example of a logic implemented with a ladder diagram for vault-door restraint operation according to one embodiment of the present disclosure.

FIGS. 4A-4G illustrate an example of a logic implemented with a ladder diagram for vault-door restraint operation according to one embodiment of the present disclosure. FIG. 4A particularly shows a segment of ladder diagram implementing an operation that grants an authority, for example, by a manager of the security system such as a bank manager. At step 1 (402) shown, a bank manager group CH10 swiping on a card reader LV10 within time zone TZ10 results in inversion of register FLP10. At step 2 (402), if the icons specified on this rung evaluates to true, CH22 is assigned to the card holder information. If FLP10 is true, signifying that the Reader LV10 has been enabled, and card from CH21 group is swiped on LV10 Reader within TZ10, CH22 is assigned to the card holder information, meanwhile, Boolean variable LV22 is set to TRUE. In this implementation, LV22 is used to save the state of this line. Simultaneously, DRS22, APB23 states are set to TRUE, to enable DURESS and ANTI-PASSBACK.

Figure 4B:
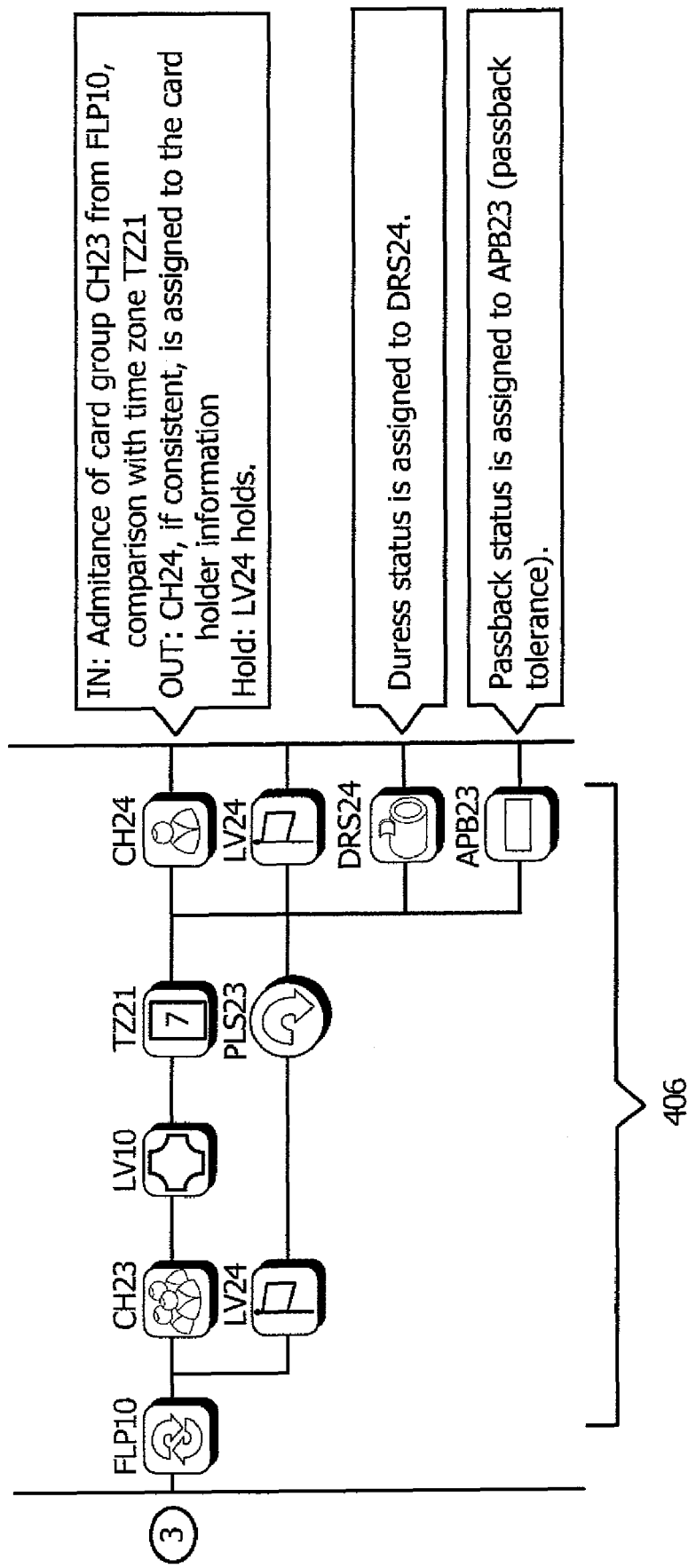

FIG. 4B illustrates a step of comparing the second card group. At step 3 (406), if FLP10 is true, and a card from CH23 group is swiped at reader LV10 within the time zone specified in TZ21, CH24 is assigned the card holder information. PLS23 and LV24 are used to store the state of the line temporarily.

Figure 4C:
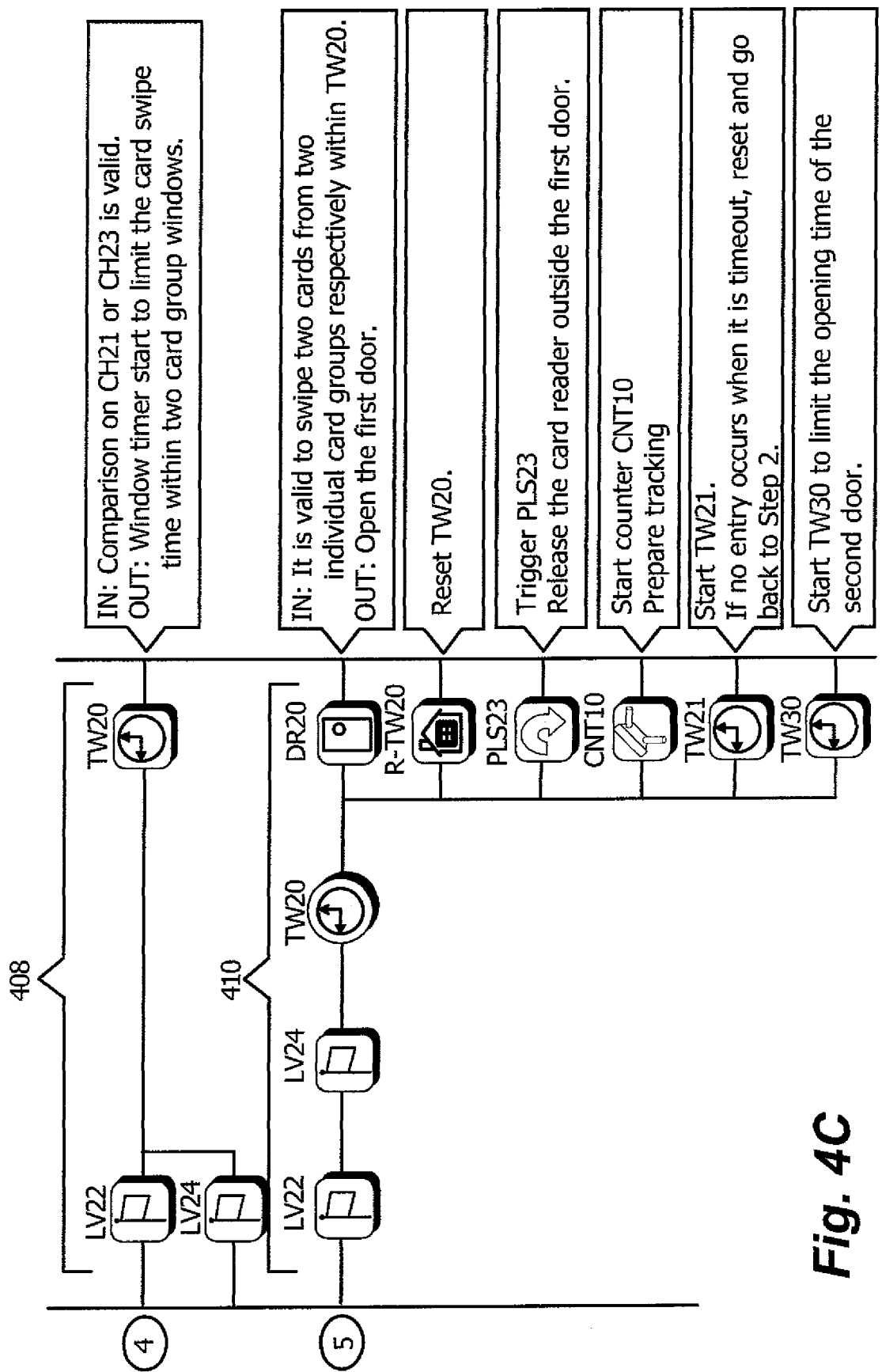

FIG. 4C illustrates steps for opening the first door. At step 4 (408), if LV22 or LV 24 is true, TW20 is started to limit the card swipe time within two drawing group windows. At step 5 (410), if both LV22 and LV24 are true and TW20 is started, DR20 is opened. Further, TW20 is reset, PLS23 is triggered to release the card reader outside the first door, a counter CNT10 is started to prepare tracking, TW21 and TW30 start. TW21 represents a time within which an entry should occur. If TW21 expires without entry, timeout occurs and the process returns back to step 2 (404) in FIG. 4A. TW30 represents a time limit for opening the second door.

Figure 4D:
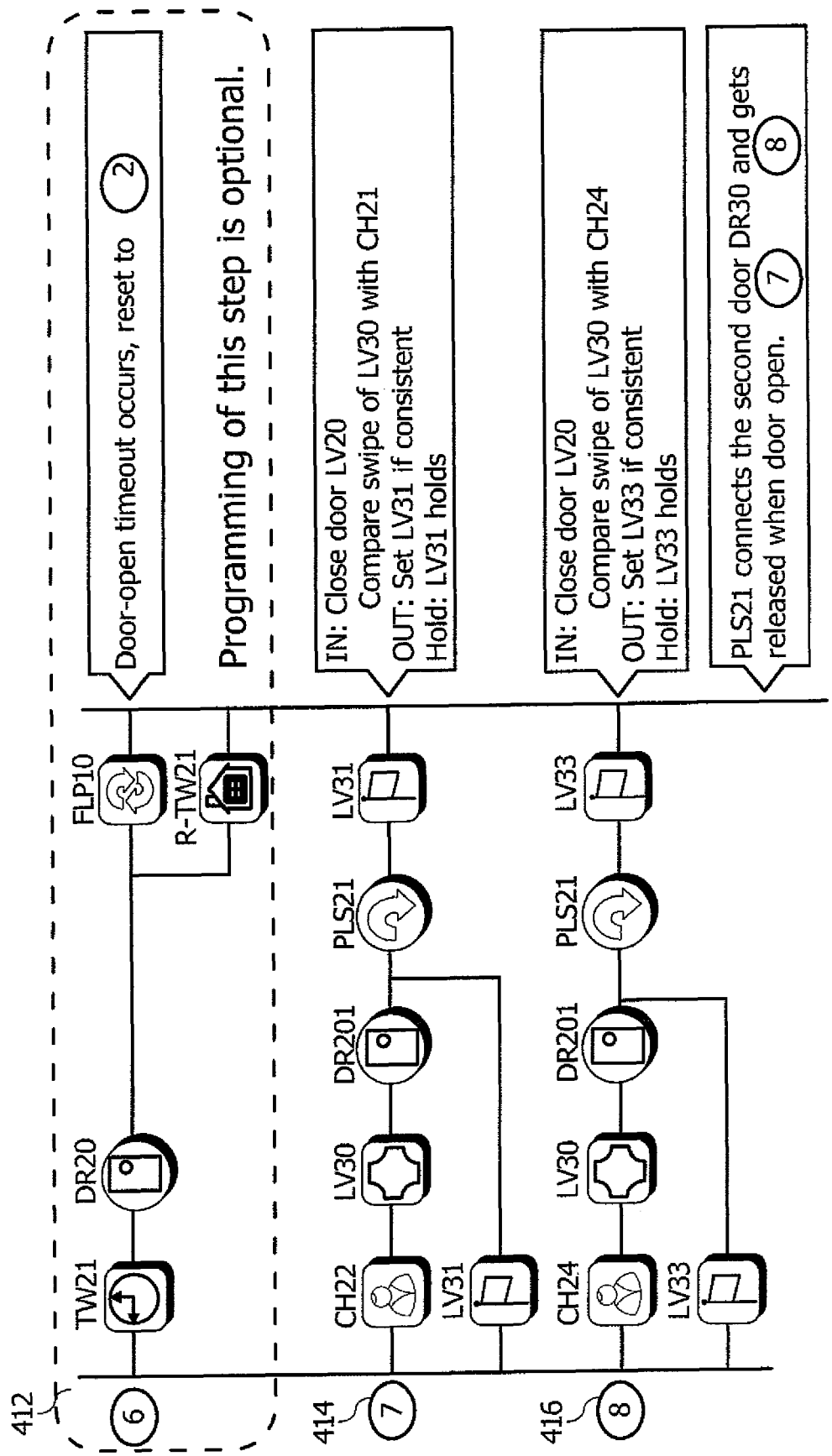

FIG. 4D illustrates steps for comparing the cardholder at the second door. At step 6 (412), if TW21 timed out on DR20, reset TW21 and return to step 2 (404) in FIG. 2. At step 7 (414), if a card is swiped at LV30 reader and belongs to user CH22 and door DR201 is closed, set LV31 flag. At step 8 (416), if a card is swiped at LV30 reader and belongs to user CH24 and door DR201 is closed, set LV33 flag.

Figure 4E:
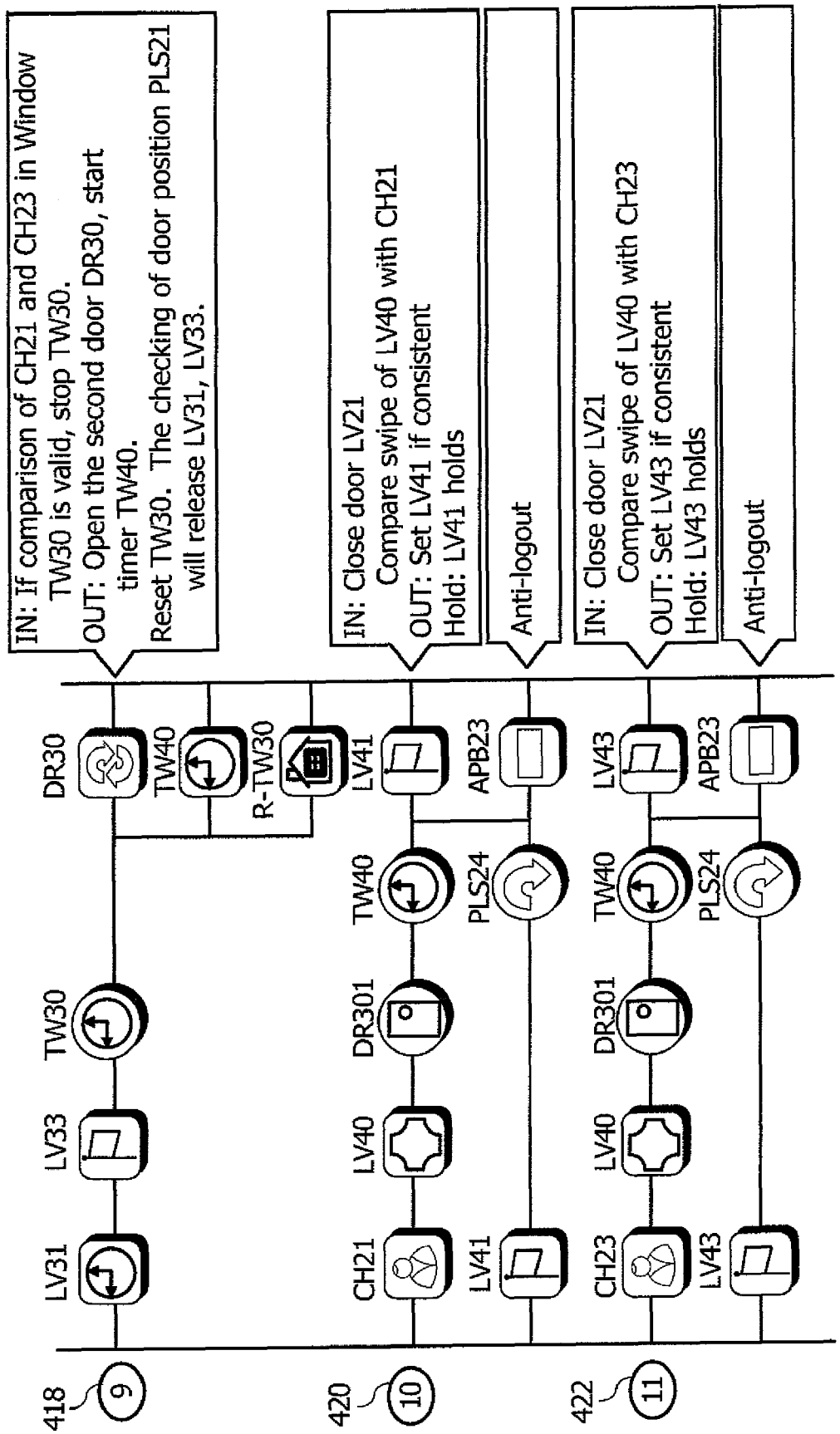

FIG. 4E illustrates steps for opening the second door. At step 9 (418), if LV31 and LV33 are true and TW30 is valid, stop TW30 and open the second door DR30, start timer TW40. TW30 is reset. At step 10 (420), if a card belonging to CH21 is swiped on LV40, DR301 door is closed and TW40 has not timed out, set LV41 flag. At step 11 (422), if a card belonging to CH23 is swiped on LV40, DR301 door is closed and TW40 has not time out, set LV43 flag.

Figure 4F:
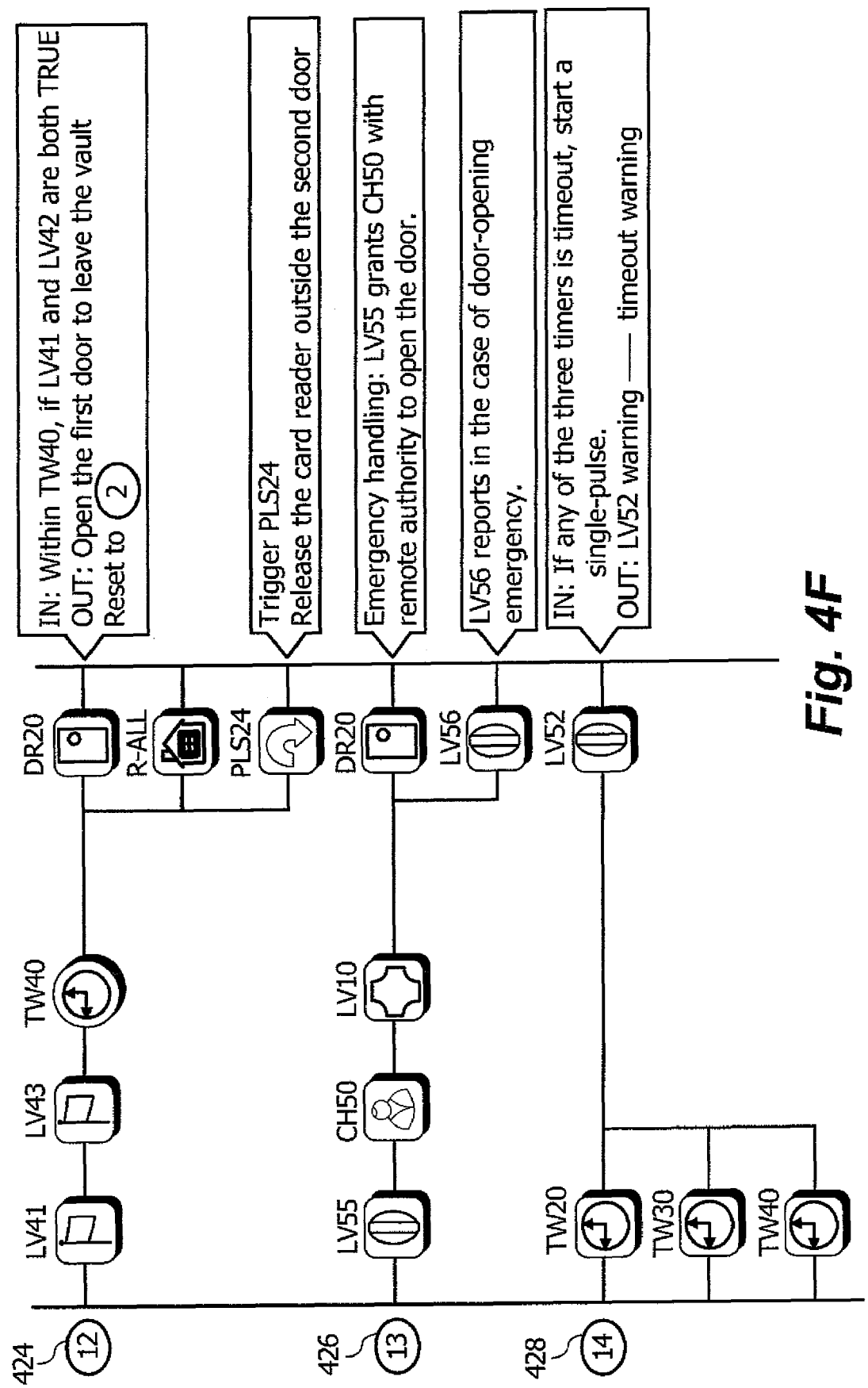

FIG. 4F illustrates steps for exiting with a door open, for example, in emergency handling. At step 12 (424), DR20 door is opened when within TW40 time, close LV41 and LV43 are true. Step 13 (426) may represent granting a user in CH50 when swiped on LV10 reader the ability to open DR20 door, for example, in emergency situations. Step 14 (428) triggers a timeout warning when any of the times expire.

Figure 4G:
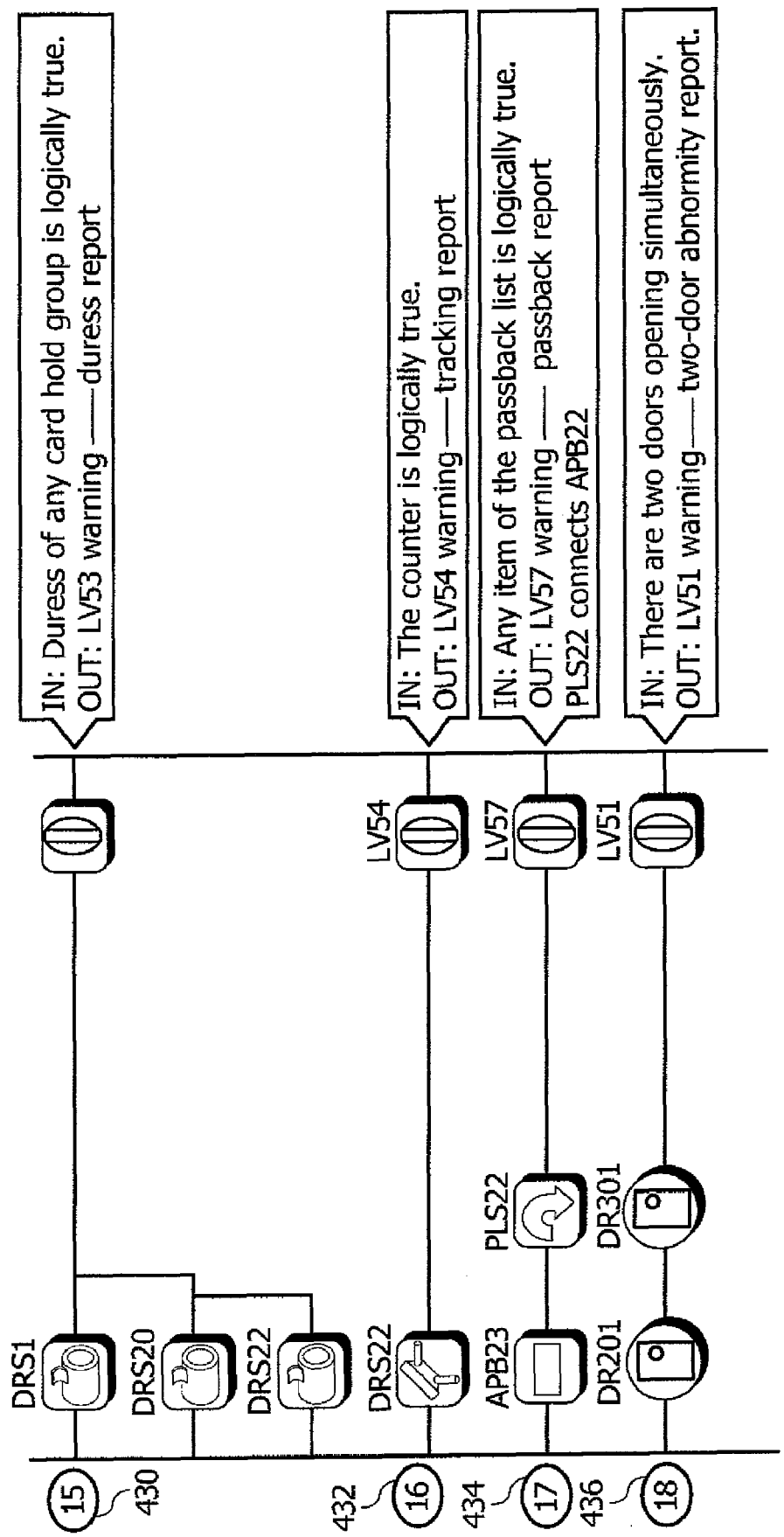

FIG. 4G illustrates steps that implement timeout, door status, duress, tracking and passback warning. Step 15 (430) illustrates that when any of the duress parameters (DRS1, DRS20, DRS22) are set, a duress report represented by icon LV53 may be triggered. Step 16 (432) illustrates that if DRS22 counter is logically true, LV54 warning or report is triggered. Step 17 (434) illustrates that if any item of the passback list is logically true, passback report is generated. Step 18 (436) illustrate that if there are two doors opening simultaneously (for example, DR201 and DR301), a warning represented by LV51 parameter, for example, two-door abnormally opened warning, may be generated.

Figure 5:
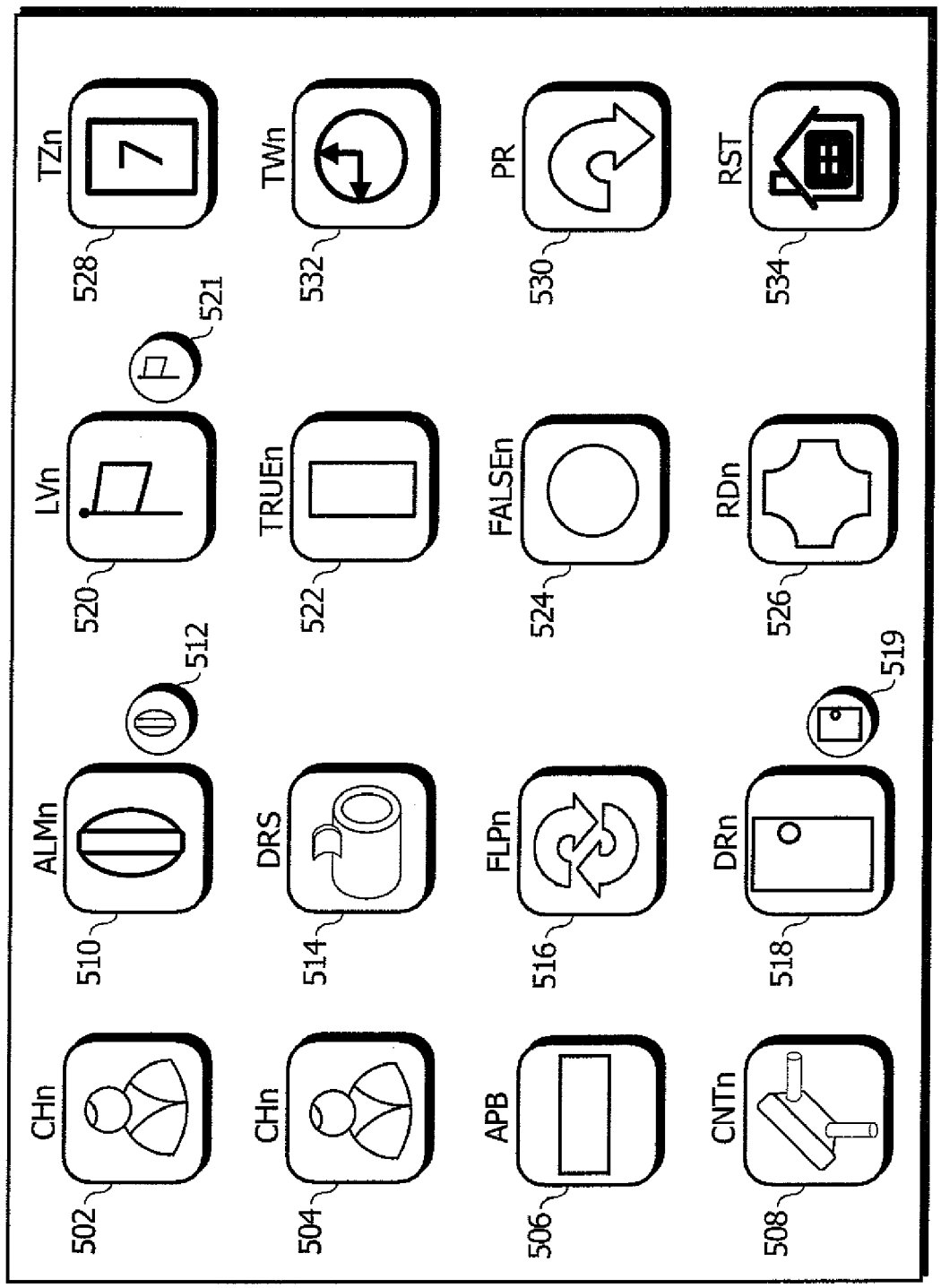
FIG. 5 illustrates examples of the icons that may be used to implement rules logic in the ladder diagram of the present application.

FIG. 5 illustrates examples of the icons that may be used to implement rules logic in the ladder diagram of the present application. The icon 502 represents a logical variable associated with a card holder group. The values may be one or many. The icon 504 represents a logical variable with respect to a cardholder. For instance, if an input card is consistent with the stored identification is otherwise valid, this icon is assigned a valued of that cardholder. This passback icon 506 may hold passback list which contains information as to whether a card is swiped again in the same reader, different reader, within what period of time, etc. Logical variable icon 510 represents Alarm, and logical variable icon 512 represents Alarm Reset (512 is a logical of 510). DRn Logical variable icon shown at 518 represents general logic for opened door. Icon at 519 represents general logic for closed door. Logical variable icon 520 represents a general logical flag when set (1) and the icon 521 represents a general logical flag when reset (0). TRUEn icon shown at 522 represents logical constant "1" and FALSFn icon shown at 524 represents logical constant "0". TZn icon 528 represents time zone. A parameter associated with this icon is set to true if a card is swiped during the time specified in the TZ icon. RDn icon shown at 526 represents a card reader. A parameter associated with this icon is set to true if there occurs a card swipe in a specified card reader. The swiped card number may be stored temporarily for further comparison. TWn icon 530 represents window timer. If the time, once triggered, does not stop until the time expires, it provides logical true. CNTn icon shown at 508 represents a counter. A counter value associated with this icon is decremented at the occurrence of specified events and when the value reaches zero, a logical value associated with this icon is set to true. DRS icon 514 represents duress. If under duress, logical value associated with this icon is set to true. This icon may also store or be associated with information related to the cardholder that is under duress. FLPn icon 516 represents reverting or flipping a register. PR icon 532 represents single-pulse logical variable. RST icon 534 represents reset logic. When triggered, one or more variables associated with this icon are reset. FLP is a logic variable, which can reserve its former state. It is often used to implement enabling one or more readers. A person of ordinary skill in the art will appreciate that additional or different set of icons may be used to implement the method and system of the present disclosure.

Figure 6:
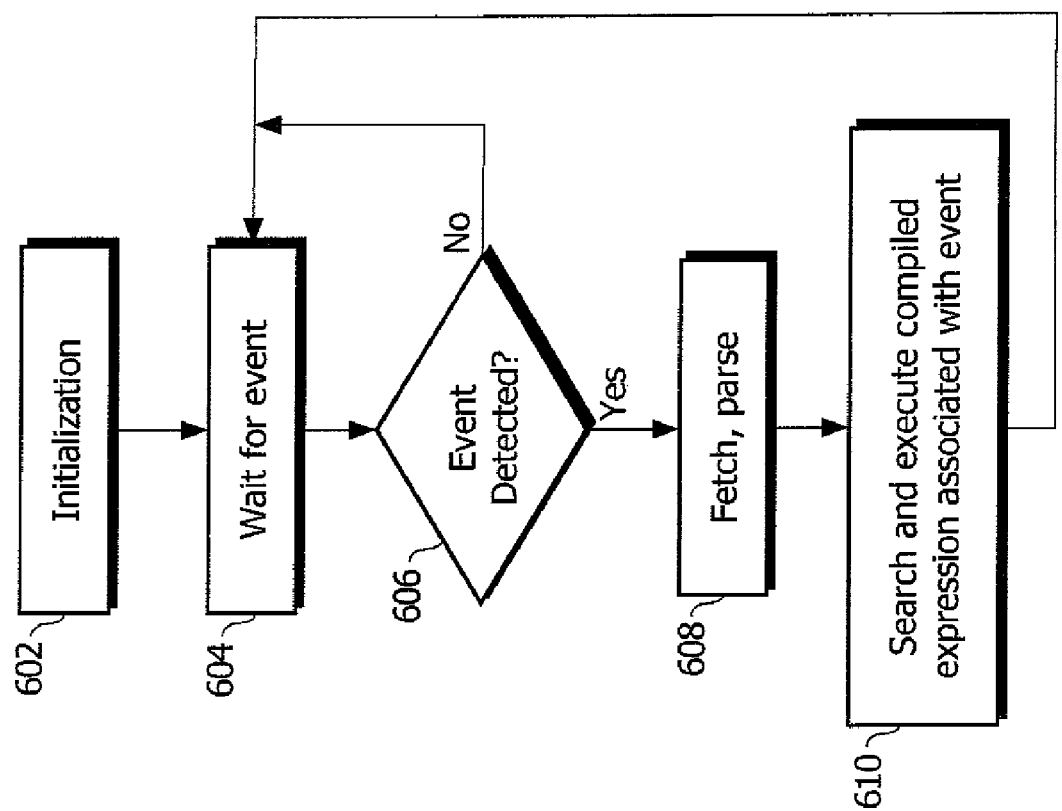
FIG. 6 is a flow diagram illustrating an operation in one embodiment of a rules engine proxy.

FIG. 6 is a flow diagram illustrating an operation in one embodiment of a rules engine proxy. At 602, the rules engine proxy initializes the data tables, for example, "expression table", "parameter table", "function table", etc., and performs self-checking. At 604, after initialization, the rules engine proxy goes into a loop and waits for events to occur. Examples of event may be a card swipe, door opening, timeout, etc. At 606, if the engine detects that any events has happened, it fetches the event and parses it at 608. At 610, the rules engine searches for one or more functions and parameters associated with the event. The rules engine compiles one or more functions and parameters and compiles them. The rules engine then executes the compiled expression line by line and takes one or more actions accordingly. The processing returns to wait state at 604, when this processing completes.

Figure 7:
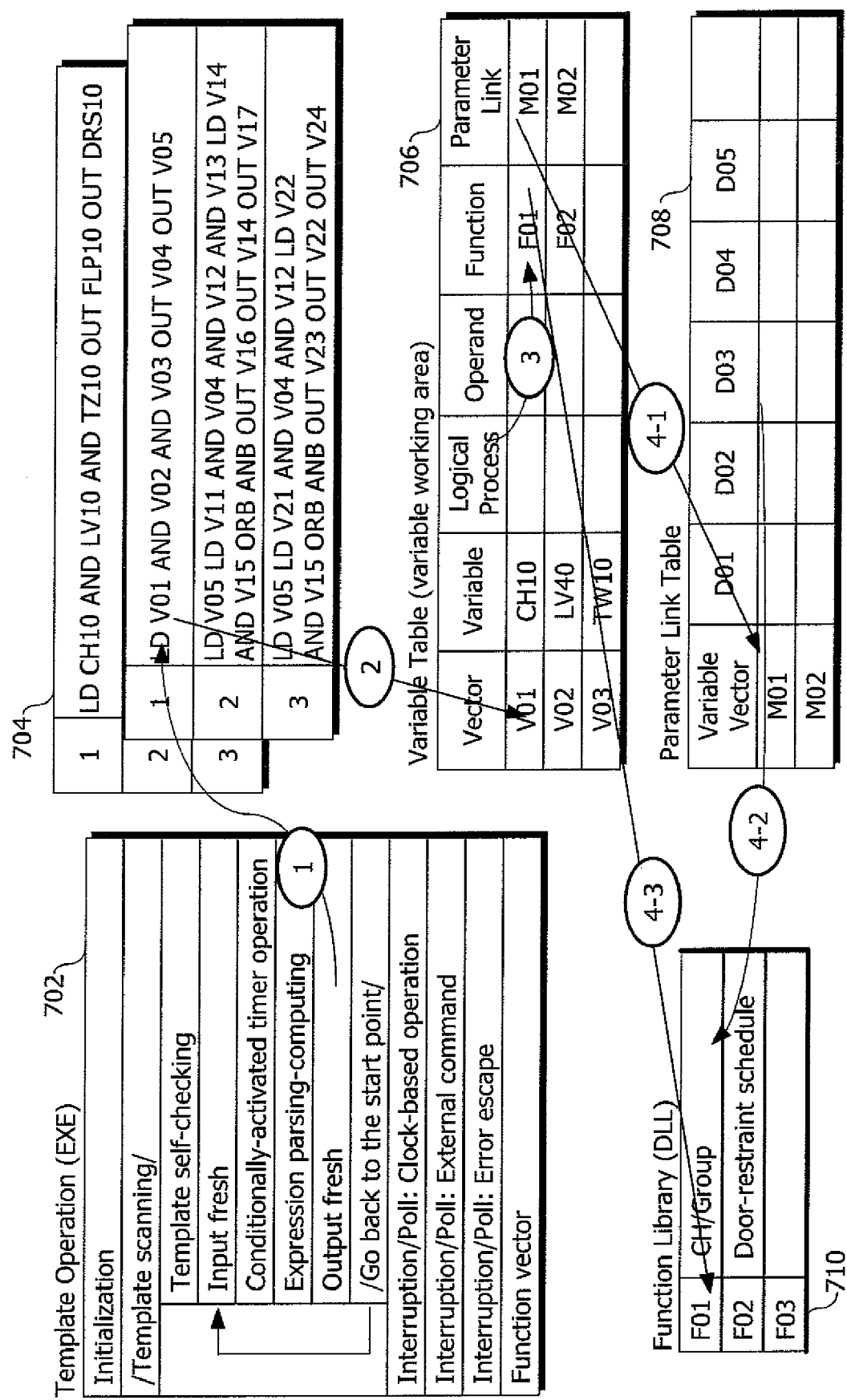
FIG. 7 illustrates examples of components used in the rules engine in its operation.

FIG. 7 illustrates examples of components used in the rules engine in its operation. Template Operation 702 illustrates execution procedures or functionalities of the rules engine in one embodiment of the present disclosure. The rules engine, for example, initializes data tables and performs "template scanning" which may comprise sub-procedures such as "template self-checking", "input fresh", and "output fresh". "Template self-checking" may check the data store in rule engine. "Input fresh" gets input data such as card swipe information, timer expired information, etc. "Output fresh" outputs data to send commands such as open door, send alarm, etc. Rules engine may store "expression language" data table 704, which includes expression forms of graphic diagrams on the user interface. It describes the relationships of graphic diagram. Data table 706 is a variable table, which includes all information (variable type, index of function library, etc.) associated with each variable in the list. Data table 708 is a parameter link table. It stores different data for different variables, for example, card number, reader number, etc.

In one embodiment, the expression language table 704 is parsed line by line. Variable table 706 is searched by vector index (V01, V02, etc.) of each node in the line expression. From the variable table 706, the index of the function associated with the variable being considered is identified from the function. One or more parameter associated with the variable being considered is also identified using the parameter link table 708. The identified function and parameters are then passed to the function library, which executes the identified function with the parameters.

While the above description provided an example use of the access control system of the present disclosure in relation to vault door operation for example of a bank and using identification cards swiped at a reader device, the access control system may be used in any other applications, for example, to secure building, areas, data, etc. Further, the identifying devices need not be limited to cardkeys, rather may include any known or will be known methodologies including but not limited to smart cards, computer chips, biometrics, etc.

The system and method of the present disclosure may be implemented and run on a general-purpose computer, a processor, and/or hardware circuitry. The computer system may be any type of known or will be known systems and may typically include a processor, memory device, a storage device, input/output devices, internal buses, and/or a communications interface for communicating with other computer systems in conjunction with communication hardware and software, etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. An access control system, comprising:
   a client application running on hardware circuitry operable to provide a user interface for allowing a user of the client application to dynamically configure a set of rules and associated parameters for controlling access by a person to an entity based upon information from a card reader, wherein said interface uses a ladder icon diagram for configuring said set of rules and associated parameters;
   a plurality of preexisting icons within the client application selected from the user interface by the user of the client application that each define a component of the dynamically configured set of rules and associated parameters within the ladder icon diagram, at least a first of the plurality of icons comprising a card reader icon and a second of the plurality of icons comprising a user icon that identifies each of a plurality of card users authorized to use the card reader and wherein the user clicks on an icon of the plurality of icons that define the set of rules to display and change parameters of the icon;
   a rules engine proxy running on the hardware circuitry operable to receive one or more icons of the plurality of icons selected by the user of the client application from the client application the received icons defining said rules and associated parameters, the rules engine proxy further operable to dynamically compile and execute said rules; and
   a controller running on the hardware circuitry coupled to the rules engine proxy operable to receive input from the card reader and further operable to trigger the rules engine proxy to execute one or more of said rules in response to the received input and generated corresponding output, wherein said controller uses access control logic which is represented by said ladder diagram, wherein said ladder diagram has a plurality of rungs and each rung has a plurality of icons, exclusive of a right most icon, wherein upon detecting variables represented by the plurality of icons appearing on the same rung of the ladder evaluate to a value, setting a variable represented by the right most icon evaluating to a predetermined value dependent on said value of said plurality of icons.

2. The system of claim 1, wherein the user interface implements said ladder icon diagram for configuring said rules and associated parameters, said rules being built using said plurality of icons representing elements of said rules and logical operations among the plurality of icons.

3. The system of claim 2, wherein the user interface allows adding, deleting and updating of one or more parameters associated with an icon of said plurality of icons.

4. The system of claim 2, wherein the user interface provides drag and drop capabilities for dragging and dropping the icons into the ladder diagram for building a rule.

5. The system of claim 1, wherein the rules engine proxy includes a static function library and variable library that is generated dynamically based on the received rules and associated parameters.

6. The system of claim 1, wherein said input includes a card swipe, biometrics information, smart card identification, or combinations thereof, allowing multi access levels of management.

7. The system of claim 1, wherein the client application is remotely coupled to the rules engine proxy.

8. The system of claim 1, wherein the client application is coupled to the rules engine proxy via Ethernet.

9. The system of claim 1, wherein the rules engine proxy is integrated into a legacy system.

10. The system of claim 1, wherein the user interface further includes a translator operable to translate user entered rules in graphical form to an expression storable and executable by a machine.

11. A method of controlling access to a secured entity, comprising:
    providing a client application including at least a user interface operable to allow a user of the client application to configure and update a set of rules and associated parameters that allow access by a person to an entity based upon information received from a card reader;
    providing a plurality of icons within the client application selected from the user interface by the user of the client application that each define a component of the dynamically configured set of rules and associated parameters within the ladder icon diagram, at least a first of the plurality of icons comprising a card reader icon and a second of the plurality of icons comprising a user icon that identifies each of a plurality of card users authorized to use the card reader and wherein the user clicks on an icon of the plurality of icons that define the set of rules to display and change parameters of the icon;
    the user of the client application selecting from the user interface one or more of the plurality of icons and building said rules using a ladder diagram defined by the one or more selected icons, wherein said ladder diagram has a plurality of rungs and each rung has a plurality of icons, exclusive of a right most icon, wherein upon detecting the variable represented by each of the plurality of icons appearing on the same rung evaluate to a value, setting a variable represented by the right most icon to a value dependent on said value of said plurality of icons;
    receiving said rules and associated parameters;
    dynamically generating executable expressions based on said rules and associated parameters; and
    executing said expressions in response to an event.

12. The method of claim 11, wherein said event is receiving a card swipe, biometrics information, smart card identification, or combinations thereof.

13. The method of claim 11, wherein said user interface is operable to allow a user to dynamically configure said rules and associated parameters for controlling access to an entity.

* * * * *